United States Patent
Auriemma et al.

(10) Patent No.: US 7,437,484 B2
(45) Date of Patent: Oct. 14, 2008

(54) METHOD FOR OPTIMIZING SYNCHRONIZATION

(75) Inventors: Stephen T. Auriemma, Chelmsford, MA (US); Maria M. Corbett, Lexington, MA (US); Michael R. O'Brien, Westford, MA (US); Ashok C. Mammen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 10/745,529

(22) Filed: Dec. 29, 2003

(65) Prior Publication Data

US 2005/0165947 A1    Jul. 28, 2005

(51) Int. Cl.
*G06F 15/16* (2006.01)
*G06F 7/00* (2006.01)
*G06F 17/30* (2006.01)
*G06F 3/00* (2006.01)
*G06F 9/44* (2006.01)
*G06F 9/445* (2006.01)
*H04L 12/28* (2006.01)

(52) U.S. Cl. .............. 709/248; 709/200; 709/228; 709/232; 707/1; 707/201; 710/21; 717/168; 717/171; 717/174; 370/392

(58) Field of Classification Search ............... 709/248, 709/200, 228, 232; 707/1, 201; 710/21; 717/168, 171, 174; 370/392, 509
See application file for complete search history.

(56) References Cited

U.S. PATENT DOCUMENTS

| 7,007,003 | B1 * | 2/2006 | Rybicki ................. 707/1 |
| 2003/0021274 | A1 * | 1/2003 | Siikaniemi et al. ........ 370/392 |
| 2003/0023759 | A1 * | 1/2003 | Littleton et al. ........... 709/248 |
| 2003/0217181 | A1 * | 11/2003 | Kiiskinen ................. 709/248 |
| 2004/0117507 | A1 * | 6/2004 | Torma .................... 709/248 |
| 2004/0205263 | A1 * | 10/2004 | Sivaraman et al. .......... 710/21 |
| 2005/0039178 | A1 * | 2/2005 | Marolia et al. ............ 717/168 |
| 2005/0125459 | A1 * | 6/2005 | Sutinen et al. ............ 707/201 |

OTHER PUBLICATIONS

"SyncML Sync Protocol, version 1.1", printed from www.openmobilealliance.org/syncml, Feb. 15, 2002, 62 pages.
"Building an Industry-Wide Mobile Data Synchronization Protocol—SyncML White Paper", Version 1.0, printed from www.openmobilealliance.org/syncml, no date, 14 pages.

* cited by examiner

*Primary Examiner*—Ashok B. Patel
*Assistant Examiner*—Kishin G Belani
(74) *Attorney, Agent, or Firm*—Pillsbury Winthrop Shaw Pittman, LLP

(57) ABSTRACT

A method is provided for optimizing a SyncML slow sync between a proprietary client and server. When a slow sync is detected, the client and server can depart from the normal SyncML protocol and process summary data without having to compare all items on a field-by-field basis.

9 Claims, 2 Drawing Sheets

METHOD FOR OPTIMIZING SYNCHRONIZATION

FIELD OF THE INVENTION

This invention relates to a system and method for performing an optimized SyncML slow sync between a proprietary client and server.

BACKGROUND OF THE INVENTION

Synchronizing client and server data is typically known. SyncML is a protocol that defines a common data synchronization protocol that may be used industry-wide. Client and server devices exchange information with each other regarding changes to documents and other files stored at their respective locations. Anchors are used to inform the receiving client or server of the time the last update was received from the sending client or server. These anchors are sometimes missing or corrupt.

In the SyncML and other synchronization protocols, devices being synchronized with each other for the first time, or whose anchors are missing or corrupt, require a full document-by-document, field-by-field synchronization. This field-by-field sync is known as a slow sync. The slow sync may be desired for many reasons. For example, the client or the server has lost its change log information or the sync anchors may be mismatched.

Slow sync is a two-way synchronization process. During a slow sync, a client device must send all of the documents in its database to the server. The server then compares all of the documents received from the client with the documents the server has stored. After performing a sync analysis, the server returns all needed modifications to the client. Doing a field-by-field analysis during a slow sync can be very inefficient because large amounts of unnecessary data for each document may be exchanged.

Other limitations and problems also exist.

SUMMARY OF THE INVENTION

A system and method is provided for optimizing the performance of a SyncML slow sync between a proprietary client and a proprietary server.

According to some embodiments of the invention, a server and client must be designated proprietary to take advantage of this slow sync optimization. In other embodiments, a proprietary client and/or server may support other non-proprietary SyncML compliant devices by performing a full slow sync. In some embodiments, the data being synchronized supports a global unique identifier and a modified time for each document.

According to some embodiments, a proprietary client may send summary data during a slow sync and a proprietary server may process summary data during a slow sync.

According to some embodiments of the invention, client and server messages are exchanged which include message anchors. The message anchors may indicate the date and time of the last update or modification. If the anchors are missing or corrupt, a slow sync may be initiated.

According to some embodiments, a slow sync may be initiated by a proprietary client. The proprietary client may initiate a slow sync at the request of a server or may initiate the slow sync upon the receipt of a synchronization message having missing or corrupt anchors.

According to some embodiments, once the client and server have been identified as proprietary, a proprietary client may provide the server with summary data for all of its documents. From the summary data, the server is able to determine what changes have occurred.

According to further embodiments, a proprietary client may send summary data to a proprietary server as a series of ADD commands. The summary data may include modified message timestamps, enabling the proprietary server to immediately process the ADD commands. In some embodiments, the proprietary server may respond to the proprietary client by sending its changes and identifying what documents need to be sent from the client.

Other objects and features of the invention will become apparent from the following detailed description considered in connection with the accompanying drawings that disclose embodiments of the invention. It should be understood, however, that the drawings are designed for purposes of illustration only and not as a definition of the limits of the invention.

DETAILED DESCRIPTION OF THE INVENTION

Figure 1:
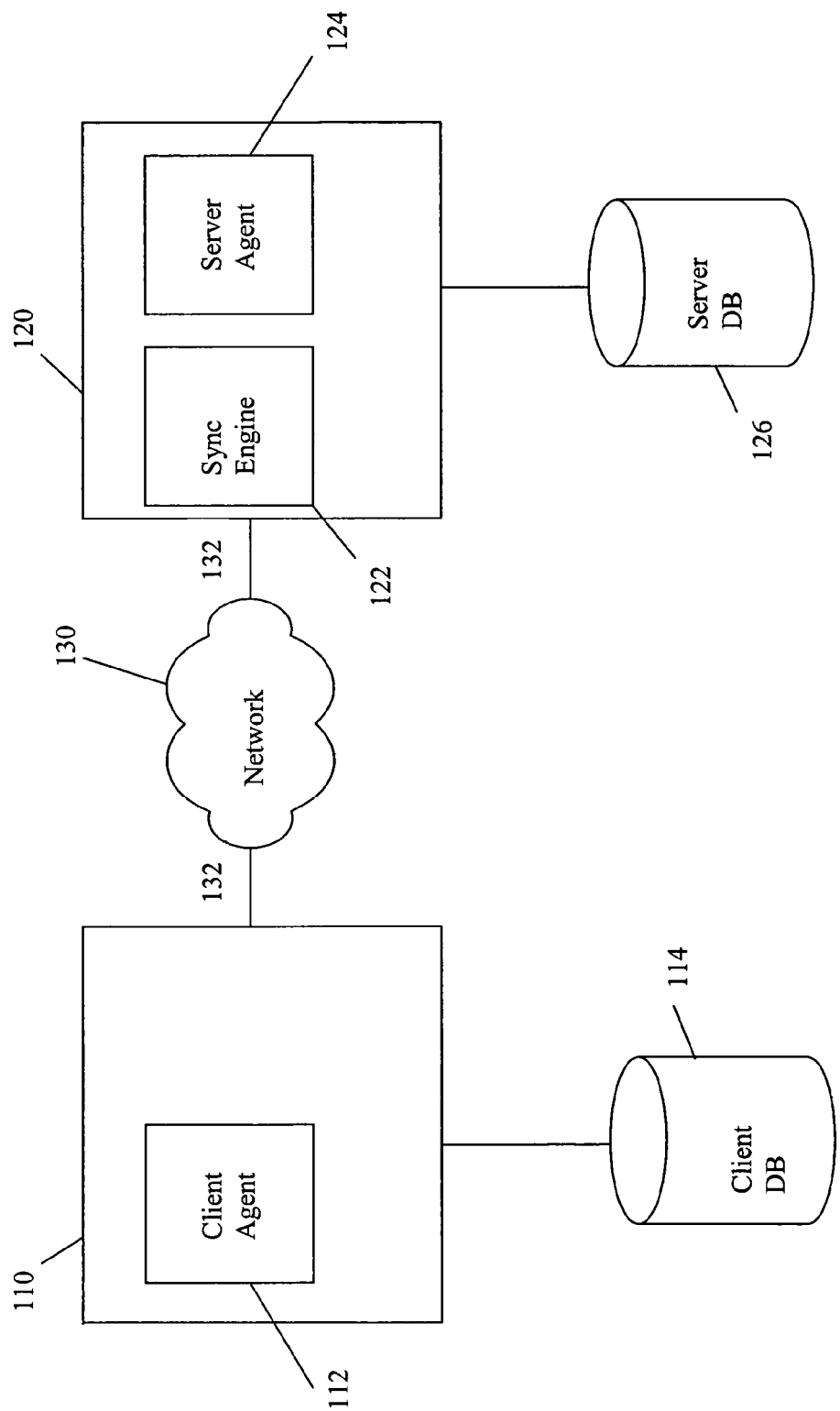
FIG. 1 illustrates a system diagram in accordance with an embodiment of the invention.

FIG. 1 illustrates a system diagram in accordance with the invention. System 100 may include a client 110. Client 110 may include a client agent 112. Client agent 112 may be used to send data modifications to a server device 120. Client agent 112 may also receive modifications from server 120. Client 110 may communicate with a storage device, such as database 114, or other storage mechanisms. While shown separate from client 110, database 114 may be integrated with client 110 or may be a part of another device, as would be apparent. Client 110 may include, for instance, a personal computer, a portable laptop computer, a handheld computer device such as a Blackberry, Palm Pilot, or other PDA, or any other client device.

Client 110 may communicate with a server 120 Over network 130 via communication link 132. Network 130 may comprise include, for example, the Internet, an intranet, a LAN (Local Area Network), a WAN (Wide Area Network), or other communications networks. Communication link 132 may include, for example, a copper telephone line, a Digital Subscriber Line (DSL) connection, an Ethernet connection, an Integrated Services Digital Network (ISDN) line, a wireless connection, or other communications link.

Server 120 may include a sync engine 122 and a server agent 124. Server 120 may communicate with a storage device, such as server database 126, or other storage mechanism. While shown separate from server 120, database 126 may be integrated with server device 120, or may be a part of another device, as would be apparent. Server 120 may be or include, for example, a personal computer, a workstation, or other suitable server device running Microsoft Windows™ NT™, Microsoft Windows™ 2000, Unix, Linux, Novell Netware™, Sun Microsystems Solaris™, OS/2™, Apache, or other operating system.

Server agent 124 may be used to send data modifications to client 110. Server agent 124 may also receive data modification from client 110. Sync engine 122 may be used for performing a sync analysis between client documents and server documents. Sync engine 122 may also be used for solving conflicts between client and server documents.

Database 114 and database 126 may store documents at the client and server, respectively. A user accessing these documents at either location may make modifications. In order to maintain consistent data at both locations, synchronization may be used. SyncML defines a uniform protocol for synchronizing devices of various types. SyncML packages are transmitted back and forth between a client and server after document changes are made, with the transfer typically beginning at a client. Before a client and server device can synchronize documents, initialization may be required. Initialization may be initiated by a client device or by a server device. Synchronization anchors may be used to indicate the range of data that needs to be synchronized. Synchronization anchors may provide the date and time of the last synchronization for a particular database, and the date and time for initializing a new sync process. A client and server device store the anchors for one another. If the anchors are missing or corrupt, a slow sync may be required.

According to one aspect of the invention, a proprietary client and server may depart from the SyncML specification during the slow sync process when missing or corrupt anchors are received. A proprietary client may send only summary data related to all documents in its database rather than the entire documents, as is done in a normal SyncML slow sync. A client may be designated proprietary by placing a notation in the Meta element of the SyncML header. A server may be designated proprietary looking for this notation in the client's SyncML header and responding by placing a notation in the Meta element of its own SyncML header. Other designations may be used to indicate that a particular client or server may depart from the SyncML specification, as would be apparent.

Figure 2:
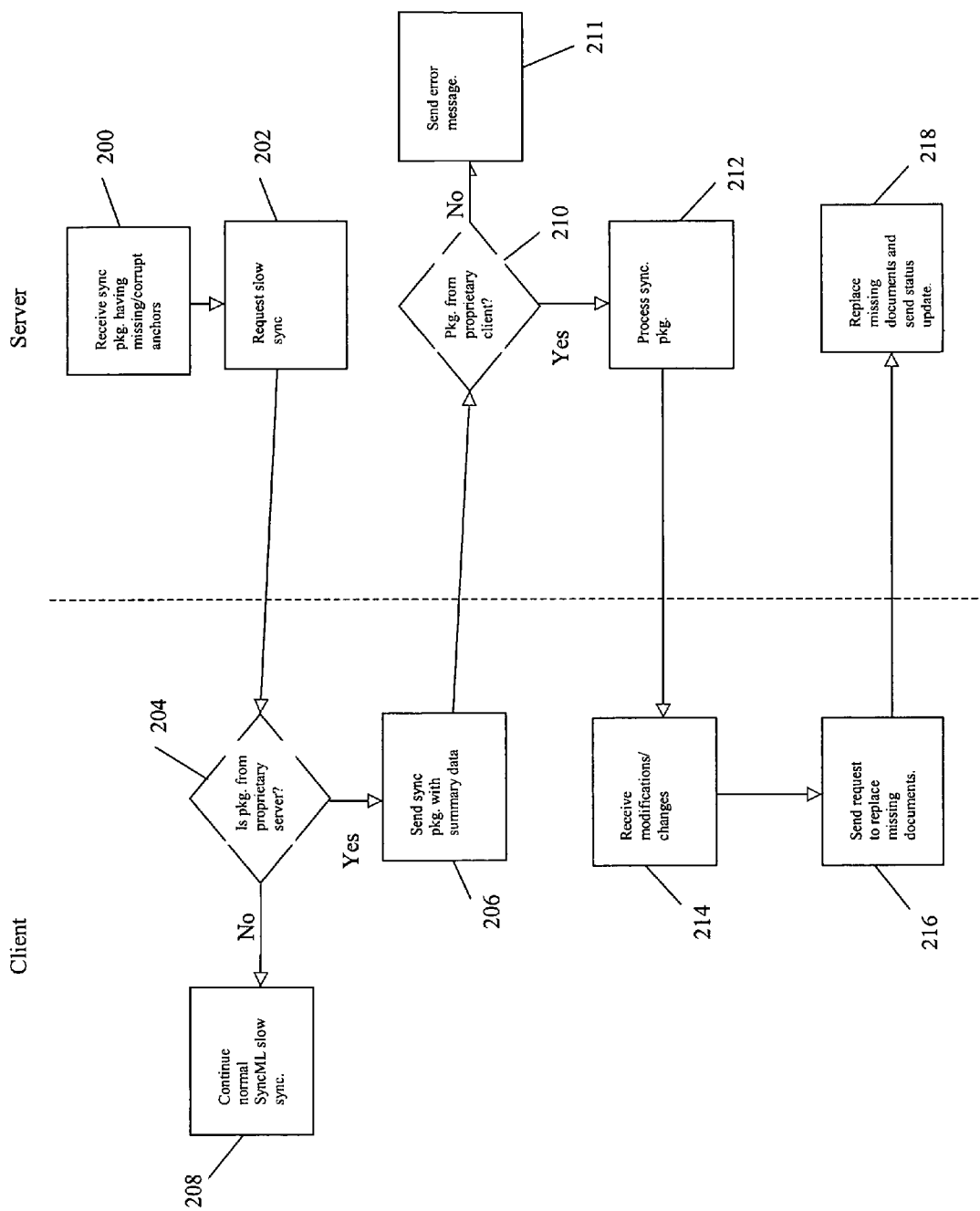
FIG. 2 illustrates a process for synchronizing a proprietary client and server, according to an embodiment of the invention.

FIG. 2 illustrates a process for synchronizing a proprietary client and server according to one embodiment of the invention. At an operation 200, server 120 may receive a synchronization package having corrupt or missing synchronization anchors. Server 120 may request a slow sync, at an operation 202. To request the slow sync, server 120 may send a slow sync initialization package to client 110. The slow sync initialization package may include a command requesting client 110 to send all of the documents from its database, synchronization anchors for the last synchronization packages received from client 110, and other initialization information.

At an operation 204, client 110 may receive the slow sync initialization package and determine if the request was sent by a proprietary server. Proprietary client may determine if the request was initiated by a proprietary server by examining header information. If the request was initiated by a proprietary server, proprietary client 110 may depart from the SyncML protocol by sending a sync package including only summary data related to all documents in its database to proprietary server 120, at an operation 206. If the request was not initiated by a proprietary server, client 110 may continue with the SyncML slow sync process by sending the contents of its entire database to server 120, at an operation 208. Summary data may be sent as a series of ADD commands having only the minimum data required to determine if the document should be included in the sync. Summary data may include document identification information, the type of action to be performed, the mime type of the data, and a message timestamp indicating the time the package is being sent.

At an operation 210, proprietary server 120 may receive the sync package from proprietary client 110 and detect whether the package was sent by a proprietary client. Normally, a client would have to respond to a server initiated slow sync request by sending all documents from its database back to the server if the anchors do not match. However, according to an embodiment of the invention, a proprietary server 120 may process the received summary data. Proprietary server 120 determines whether the sync package was sent from a proprietary client by examining header information. If proprietary server 120 does not detect a proprietary client, an error message may be sent, at an operation 211 or server may proceed according to a standard SyncML protocol.

Once proprietary server 120 has detected a proprietary client, proprietary server 120 may immediately process the ADD commands, at an operation 212. The server may process ADD commands by comparing a global unique identifier and a modified time for each document from the client to its locally stored global unique identifier and modified time. If the global unique identifier and a modified time match on both the client document and server document, then the documents are considered the same and no further processing is required for this document.

If the global unique identifier of a client document does not exist on the server, then the document is considered an addition to the server and this status is noted and sent back to client. When the client receives and processes this status, it may modify its timestamp to a value higher than the next anchor so that this missing document will be included in any subsequent sync processes. These changes may be reflected on the server on the next fast sync. If the global unique identifier of a server document does not exist on the client then the document is considered an ADD to the client and document is sent to client in response to this message.

Proprietary server 120 may send to proprietary client 110 the results of the sync after the ADD commands have been performed. Proprietary server 120 may send a status indicating whether the document is one that proprietary server 120 already has in its database or whether the database does not already contain the document. At an operation 214, the synchronization process continues when proprietary client 110 receives the modifications and results form proprietary server 120. At an operation 216, in a subsequent sync session, proprietary client 110 may respond by sending proprietary server 120 instructions to replace those records that it does not already contain, as indicated in the previous session. At an operation 218, proprietary server 120 will process the replace instructions and reply to proprietary client 110 with the status. As would be apparent, operations 216 and 218 are part of a subsequent sync; this allows proprietary client and server to comply with SyncML protocol during slow sync.

While the above describes proprietary server 120 as being the initiator of the slow sync, proprietary client 110 may also initiate a slow sync. If proprietary client 110 receives a sync package having missing or corrupt anchors, proprietary client may initiate a slow sync by issuing an alert command to proprietary server 120 that a slow sync is being started. After acknowledgement from proprietary server 120, operation continues as described above at an operation 220 with proprietary client 110 sending summary data if the server is proprietary.

While particular embodiments of the present invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A method for optimizing a slow synchronization between a client and a server, the method comprising:
    receiving, at the server, a synchronization package having missing or corrupt synchronization anchors;
    sending, by the server, a request to the client to initiate a slow synchronization process;
    receiving a slow synchronization package, at the server, wherein the slow synchronization package comprises summary data associated with documents stored at the client;
    determining, by the server, if the slow synchronization package was received from a client designated proprietary by examining a header field of the slow synchronization package, the proprietary client departing from the slow synchronization process by sending the slow synchronization package comprising the summary data associated with documents stored at the client rather than sending the documents themselves;
    processing, by the server, the received summary data associated with documents stored at the client, if the client is so designated,
    wherein processing the received summary data further comprises:
    comparing a unique identifier and a timestamp, obtained from the summary data, for each document stored at the client with a unique identifier and timestamp for each document stored at the server; and
    determining if said unique identifiers and said timestamps match for the client document and server document wherein:
        if said unique identifiers do not match, sending a status to the client indicating a document that needs to be sent by the client.

2. The method of claim 1 wherein the server has been designated proprietary.

3. The method of claim 1 wherein in response to processing the status, the client modifies its timestamp to a higher value such that the document indicated in the status is included in a subsequent synchronization session.

4. The method of claim 3 wherein the server receives the document indicated in the status during the subsequent synchronization session.

5. The method of claim 1 wherein the summary data associated with documents stored at the client is sent by the proprietary client as a series of ADD commands and the server processes the ADD commands.

6. The method of claim 1 wherein the request to initiate the slow synchronization process is sent to the server, upon receipt of a synchronization package having missing or corrupt anchors at the client.

7. The method of claim 1 wherein sending, by the server, a request to the client to initiate a slow synchronization process, further comprises:
    sending, by the server, a slow synchronization initialization package to the client, the slow synchronization initialization package including a request to the client to send all documents stored at the client.

8. The method of claim 7 further comprising:
    determining, by the client, if the request to initiate the slow synchronization process was sent by a server designated proprietary;
    wherein the proprietary client departs from the slow synchronization process by sending the slow synchronization package comprising the summary data associated with the documents stored at the client rather than the documents themselves, if the server is so designated.

9. The method of claim 8 wherein determining, by the client, if the request to initiate the slow synchronization process was sent by a server designated proprietary, further comprises:
    receiving the slow synchronization initialization package; and
    examining a header field to determine if the server has been designated proprietary.

* * * * *